United States Patent [19]

Jensen

[11] Patent Number: 4,746,230
[45] Date of Patent: May 24, 1988

[54] TILT PAD JOURNAL BEARING
[75] Inventor: Richard C. Jensen, Greensburg, Pa.
[73] Assignee: Elliott Turbomachinery Co., Inc., Jeannette, Pa.
[21] Appl. No.: 581,020
[22] Filed: Feb. 17, 1984
[51] Int. Cl.⁴ .................................................. F16C 17/03
[52] U.S. Cl. ..................................... 384/311; 384/321; 384/900; 384/905
[58] Field of Search ............... 384/309, 311, 313, 321, 384/900, 117, 905; 308/DIG. 14

[56] References Cited
U.S. PATENT DOCUMENTS 2,348,928  5/1944  Sampatacos ........................ 384/309
3,004,804  10/1961 Pinkus et al. ....................... 384/311
3,887,245  6/1975  Rouch ................................. 384/311

Primary Examiner—Lenard A. Footland
Attorney, Agent, or Firm—Webb, Burden, Robinson & Webb

[57] ABSTRACT

A tilt pad bearing assembly for use in supporting a rotating shaft is disclosed. The bearing assembly includes lubricant means for effectively cooling separate individual bearing pads, and separate cooling channels for selectively cooling a portion of the bearing pad. The bearing pads each have a specific end treatment to act in combination to provide an anti-spragging effect. Additionally by selectively cooling a portion of the bearing pad, the bearing pad may have separate configurations for low speed and high speed applications such that boundary lubrication is achieved under low speed conditions and dynamic lubrication is achieved under high speed conditions.

12 Claims, 2 Drawing Sheets

TILT PAD JOURNAL BEARING

BACKGROUND OF THE INVENTION

This invention relates to a bearing assembly for supporting a shaft for rotational displacement. More particularly this invention concerns a tilt pad journal bearing with regulated lubricant flow to and from each bearing. The pad has an anit-spragging design and may have distinct operating configurations at different temperature ranges.

Many turbomachines having large shafts are supported with a tilt pad type bearing. The tilt pad bearing includes a series of spaced arcuate pads lined with a material such as babbit which when lubricated with oil or a similar lubricant act to maintain a shaft in the desired position while provding little restraint against rotational displacement. The typical tilt pad journal bearing includes a retainer structured to maintain the various tilt pads in position. The tilt pads are arranged such that they may pivot about a point to securely fit against the shaft and such that lubricant may be forced through the bearing to both reduce friction between the bearing surface and the shaft and to cool the bearings.

With a prior art device operating under high temperature conditions the lubricant being flooded through the entire bearing becomes warm as does the bearing. Under certain operating conditions the temperature of the entire bearing becomes sufficiently hot that the life of the bearing is significantly reduced and failures may occur. Additionally the tilt pad bearing which is capable of pivoting may have a portion of its contact surface with the shaft displaced such that it digs into the surface of the shaft creating additional frictional forces. This pivoting such that the edge of the bearing groups or engages the shaft surface is called spragging.

It has also been found that tilt pad bearings should be configured differently when operating under different conditions. When the shaft is rotating very slowly it is desirable to have the shaft surface and the inner surface of the bearing coordinately mate over the entire bearing length and to have a certain amount of oil or lubricant weep into this interface to provide a reduced friction layer for promoting free rotational displacement. This is known as boundary lubrication.

When operating at high speeds it is necessary to utilize dynamic lubrication. Under high speed conditions it is desirable to have the inner surface of the bearing partially mate with the shaft and partially be displaced from the shaft. The desired configuration is to have the leading edge of the bearing displaced from the shaft sufficiently to allow a lubricant wedge to be developed therebetween and the trailing edge of the bearing to mate with the shaft to cause the lubricant to be forced therebetween. The establishment of the lubricant wedge between the shaft and the bearing acts to effectively distribute lubricant over the shaft surface under high speed and potentially high temperature conditions.

SUMMARY OF THE INVENTION

It is an object of the present invention to provide a bearing support assembly for maintaining a shaft in a desired position.

It is a further object of the present invention to provide a tilt pad journal bearing having regulated lubricant flow separately to each bearing pad.

It is another object of the present invention to provide a bearing assembly utilizing multiple tilt pads wherein the pads are designed to prevent spragging with the shaft.

It is a yet further object of the present invention to provide bearing pads capable of having multiple configurations to assume different positions when operating under different conditions.

It is a still further object of the herein invention to provide a bearing assembly capable of being selectively cooled to allow thermal gradients within the bearing to configure the bearing as desired.

Another object of the present invention is to provide a bearing assembly which is safe, economical to manufacture and maintain, easy to service and cost effective.

These and other objects of the present invention are achieved according to a preferred embodiment of the invention by the provision of a bearing assembly for supporting a shaft for rotational displacement. The bearing assembly includes a plurality of bearing pads spaced about the shaft, at least one of said pads defining a lubricant feed channel located toward the leading edge of the pad and extending axially through the pad through which lubricant may be supplied to the shaft-pad interface and a lubricant discharge channel located toward the trailing edge of the pad and extending axially through the pad for receiving lubricant supplied to the shaft-pad interface by the feed channel, and a retainer positioned radially outwardly from the pads for securing the pads in position, said retainer including means for preventing at least one pad from rotating with the shaft and further defining lubricant delivery means positioned to supply lubricant to the lubricant feed channel of the pad.

A bearing assembly for supporting a shaft for rotational displacement including a plurality of bearing pads spaced about the shaft, each pad having an innter arcuate surface for mating with the shaft and a radially outward arcuate surface is further disclosed. A retainer is mounted radially outwardly from the bearing pads including a support surface which engages a portion of the outward arcuate surface of the bearing pad to limit outward displacement thereof. Said support surface has a larger radius of curvature than the outward arcuate surface of the bearing pad to allow relative pivotal movement therebetween. At least one bearing pad has a leading edge formed with the radially inward portion on a radius and a radially outward portion displaced in a direction opposite the direction of rotation of the shaft, and at least one bearing pad adjacent the bearing pad having a leading edge has a trailing edge angled to be complementary with the leading edge of the adjacent pad whereby the forces applied between the pads tend to displace the leading edge away from the shaft to prevent spragging.

A bearing assembly for supporting a shaft for rotational displacement including a plurality of bearing pads spaced about the shaft and retainer means positioned to maintain the bearing pads in a desired position is also disclosed. The retainer means includes lubricant supply means for directing lubricant to the shaft-pad interface and at least one of said pads has a first configuration wherein the radially inward bearing pad surface mates with the outer surface of the shaft and a second configuration wherein the radially inward bearing pad surface is partially displaced from the shaft creating a gap for the receipt of lubricant.

DESCRIPTION OF THE PREFERRED EMBODIMENT

The bearing assembly described herein is designed for use in a large turbomachine. It is to be understood that other applications for a bearing assembly of this type may be equally appropriate and that some or all of the features may be incorporated in various designs. It is additionally to be understood that the number of bearing pads may be selected depending upon the specific application required.

Figure 1:
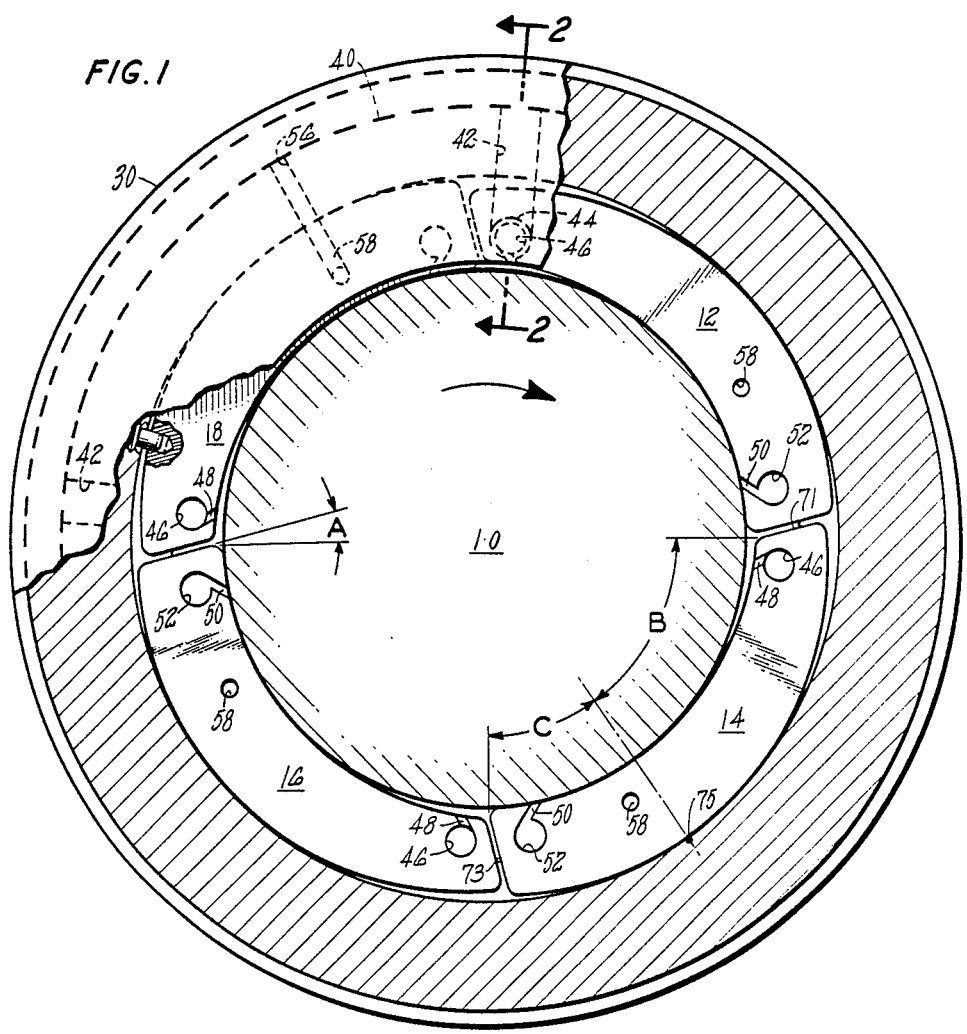
FIG. 1 is a partially cutaway side view of a bearing assembly.

Referring first to FIG. 1 there may be seen a bearing assembly for supporting shaft 10. The bearing assembly includes retainer 30 positioned radially outwardly from and designed to secure bearing pads 12, 14, 16 and 18. The four bearing pads of FIG. 1 are shown spaced radially outwardly about the entire perimeter of shaft 10. The inner bearing pad surfaces are shown to be arcuate in configuration and generally matching the exterior surface of shaft 10. It may however be additionally seen that the trailing edge 73 portion of the bearing pad 14 is shown located to more closely mate with the shaft than is the leading edge portion 71.

Retainer 30 is shown having oil groove 40 in communication with feed channel 42 to feed conduit 44. Additionally it is shown having coolant channel 56 for communicating oil to the bearing. Pivot point 75 is shown as the point at which the radially outward bearing pad arcuate surface engages the radially inward support surface of the retainer. It is additionally shown in FIG. 1 that the centerline for pivot point 75 is located a distance B from the leading edge 71 and a distance C from the trailing edge 73. Arcuate distance B is greater than arcuate distance C such that the pivot point is offset from the centerline to allow the portion towards the leading edge to be larger.

Angle A is shown as the angle between the trailing and leading edge of adjacent pads and a radius from center shaft 10. This angle is referred to as the anti-spragging bias angle.

Figure 2:
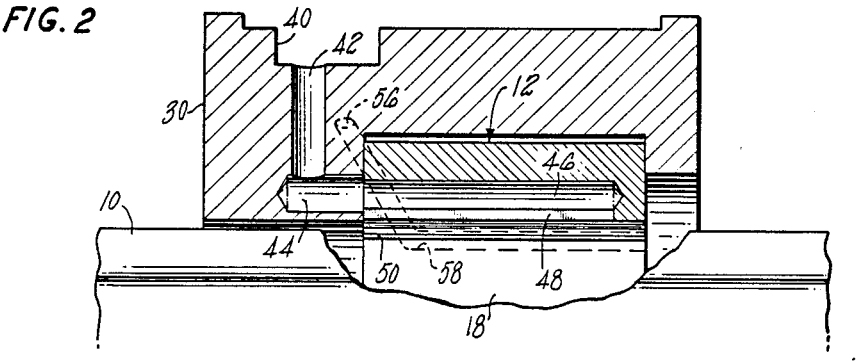
FIG. 2 is a sectional view of FIG. 1 taken at line 2—2.

Referring more particularly to FIG. 2 it may be seen that bearing retainer 30 is generally H-shaped and includes a portion for securing bearing pad 12. Oil groove 40 is shown at the top thereof in communication with feed channel 42 which is in communication with feed conduit 44. Bearing conduit 46 is shown aligned with feed conduit 44 such that lubricant flowing through the retainer may be directed into bearing conduit 46. From bearing conduit 46 the lubricant is directed to the shaft-pad interface through distributor 48 which is an inclined slot directed to divert the lubricant in the direction of rotation of the shaft. Coolant channel 56 is additionally shown extending from oil groove 40 to coolant conduit 58 for directing oil to another portion of the bearing for effective cooling of the bearing.

Oil which is directed from feed conduit 44 to the bearing conduit 47 and therefrom through coil distributor 48 flows along the shaft-pad interface until it reaches receiver 50 connected to discharge channel 52. In this manner the lubricant is directed into one end of the bearing pad, flows along the length of the bearing pad between the bearing pad and the shaft and is directed outwardly therefrom through the discharge channel and receiver. Hence the lubricant flows not through the entire bearing assembly but only through a specific bearing pad. In this manner the individual bearing pads may be maintained at the desired temperature by recirculating the lubricant without having it flow continuously about the bearing as in flooded bearing assemblies.

Figure 3:
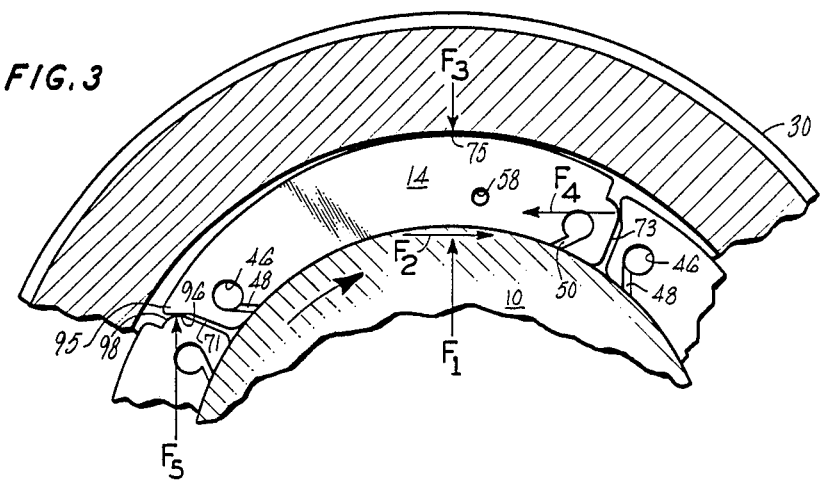
FIG. 3 is a schematic view showing the forces involved in the bearing assembly.

FIG. 3 is a force diagram showing essentially the same bearing retainer and bearing pad elements as in FIG. 1. The bearing retainer 30 is shown having bearing pad 14 mounted radially inwardly therefrom and rotating relative thereto and pivot point 75. The shaft 10 is shown being located radially inwardly from bearing pad 14. The various forces at work on the bearing pad are specifically indicated. The force $F_1$ is the cumulative force created by the pressure from the oil wedge formed between the shaft and the bearing pad. This force acts to direct the bearing pad in counterclockwise moment about the pivot point. The force $F_2$ is the oil wedge shear force which additionally acts to direct the pad in a counterclockwise direction. The force $F_3$ is due to pad retainer loading and is effectively neutral relative to causing rotation about the pivot point. Forces $F_4$ and $F_5$ are pad trailing edge reaction force ($F_4$) and the pad leading edge reaction force ($F_5$). Both these forces act to rotate the pad in the clockwise direction and are sufficiently large that they overcome forces $F_1$ and $F_2$. It is forces $F_4$ and $F_5$ which create the anti-spragging effect.

The force $F_4$ is created by the leading edge of the bearing pad not numbered acting to push the trailing edge of the bearing pad 14 to the left as shown. This acts to cause the entire pad to rotate in the clockwise direction displacing the leading edge of bearing pad 14 from the shaft.

The trailing edge of the bearing pad located to the left of leading edge 71 additionally acts to force the leading edge in a clockwise direction. When the leading edge is forced in a clockwise direction it is that portion of the pad which is displaced from the shaft such that a gap is created allowing an oil wedge to be provided. This is the manner in which dynamic lubrication is unencumbered. In the embodiment shown in FIG. 3 the leading edge includes a projection 95 having a contact surface 96 which engages trailing edge contact surface 98. It is the force between these two as transmitted around all the bearing pads of the assembly which acts to create the anti-spragging force on each bearing pad. Again by anti-spragging it is meant that the leading edge of the bearing pad is moved away from the shaft such that there will be no tendency for the leading edge to dig into the shaft surface causing additional frictional forces. Additionally by use of anti-spragging forces the bearing pad is displaced from the shaft surface to provide additional opportunity for an oil wedge to be created.

Figure 4:
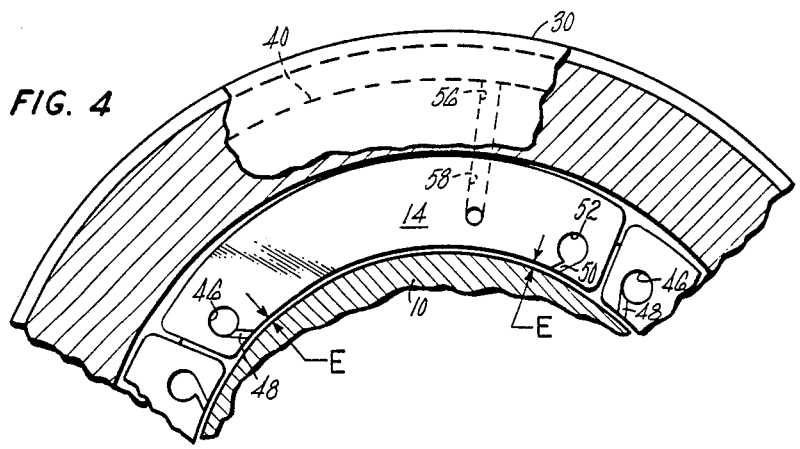
FIG. 4 is a schematic view showing the bearing pad and shaft positions for low speed operation.
Figure 5:
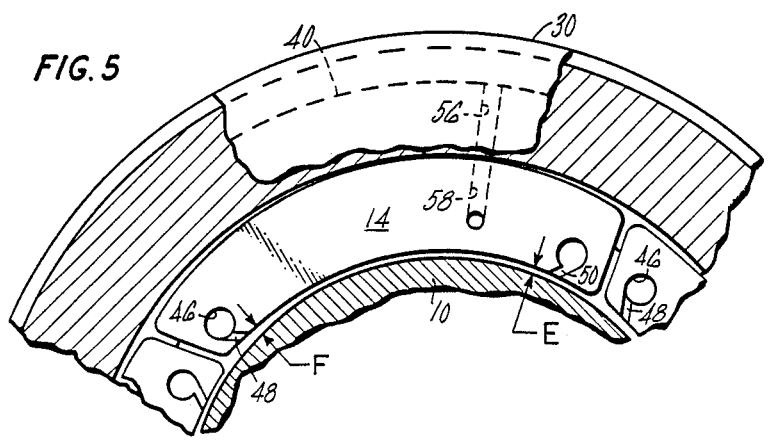
FIG. 5 is a schematic view showing the bearing pad and shaft positions for high speed operation.

FIGS. 4 and 5 are schematic views of bearing pad 14 and retainer 30. In FIG. 4 which is designed to be representative of low speed application utilizing boundary lubrication, it may be seen that the gap labeled E at both instances between bearing pad 14 and the shaft is identical. It is desired that the bearing pad will mate with the exterior surface of the shaft at low speeds such that boundary lubrication is maintained over the entire surface. Any other arrangement results in reduced bearing life. Bearing coolant channel 58 is shown for supplying lubricant to a portion of the bearing to effectively cool the same. This comes into play as shown in FIG. 5 when it is desired to operate the shaft at high speed.

Under high speed conditions it is desirable to have dynamic lubrication. The configuration as shown in FIG. 4 is ineffective under dynamic lubrication applications because of the necessity of establishing an oil wedge for promotiing lubricant distribution. Under high speed applications the operating temperature of the bearing assembly is increased. Due to the thermal properties of the bearing, the pad will tend to expand, having a larger radius of curvature as it is heated. Lubricant channel 58 is utilized to cool a portion of the bearing such that a portion of the bearing is cooled and does not expand. The babbitted edge portion is allowed to heat up and expand such that a gap designated F is created between the shaft and bearing surfaces at that location. Hence gap E is maintained as it was in FIG. 4 under low speed applications but the gap F is enlarged to allow the oil wedge to be provided for dynamic lubrication purposes.

The invention herein has been described to disclose the improved properties of allowing oil to directly flow through only one bearing creating improved cooling of that bearing path. Additionally an end treatment to create an anti-spragging effect and to promote dynamic lubrication is provided.

The invention has been described with reference to a particular embodiment herein. It is to be understood by those skilled in the art that variations and modifications can be effected within the spirit and scope of the invention.

I claim:

1. A bearing assembly for supporting a shaft for rotational displacement which comprises:
   a plurality of bearing pads spaced about the shaft, at least one of said pads defining a lubricant feed channel located toward the leading edge of the pad and extending axially through the pad through which lubricant may be supplied to the shaft-pad interface, and a lubricant discharge channel located toward the trailing edge of the pad and extending axially through the pad for receiving lubricant supplied to the shaft-pad interface by the feed channel;
   a retainer positioned radially outward from the pads for securing the pads in position, said retainer including means for preventing at least one pad from rotating with the shaft and further defining lubricant delivery means positioned to supply lubricant to the lubricant feed channel of the bearing and wherein at least one bearing pad further defines a lubricant distributor extending from the lubricant feed channel to the shaft-pad interface being angled in the direction of rotation of the shaft to promote the establishment of a lubricant film between a shaft and a pad.

2. The assembly as set forth in claim 1 wherein the radially outward surface of the bearing is arcuate having a first radius of curvature and wherein the retainer includes an arcuate supporting surface having a second radius of curvature greater than the first radius of curvature such that the bearing pad may pivot relative to the retainer and wherein the pivot point of the bearing pad when assembled to the shaft is displaced from the center of the pad toward the trailing edge of the pad to promote the establishment of an oil film towards the leading edge of the pad.

3. The assembly as set forth inclaim 1 and further comprising the bearing pad defining a cooling channel and the retainer lubricant delivery means being also positioned to supply lubricant to the cooling channel to effect additional cooling of the bearing pad.

4. The assembly as set forth in claim 1 wherein the leading edge of one pad and the trailing edge of the adjacent pad are formed at a bias angle from a radius of the shaft, said angle being inclined against the direction of rotation of the shaft as the edges extend radially from the shaft such that at least one pad supplies an anti-spragging force to the adjacent pad.

5. A bearing assembly for supporting a shaft for rotational displacement which comprises:
   a plurality of bearing pads spaced about the shaft, each pad having an inner arcuate surface for mating with the shaft and a radially outwardly arcuate surface;
   a retainer mounted radially outwardly from the bearing pads including a support surface which engages a portion of the outward arcuate surface of the bearing pad to limit outward displacement thereof, said support surface having a larger radius of curvature than the outward arcuate surface of the bearing pad to allow relative pivotal movement therebetween;
   at least one bearing pad having a leading edge formed with the radially inward portion angled from a radius and the radially outward portion displaced in a direction opposite from the direction of rotation of the shaft; and
   at least one bearing pad adjacent the bearing pad having a trailing edge angled to be complementary with the leading edge of the adjacent pad whereby the forces applied between the pads tend to displace the leading edge away from the shaft to prevent spragging.

6. The assembly as set forth in claim 5 wherein each bearing pad of the assembly has a leading edge and a trailing edge coacting with the appropriate edge of the adjacent pad.

7. The assembly as set forth in claim 6 wherein each pad includes an outwardly extending projection defining a contact surface as a portion of the leading edge and wherein the pad having the trailing edge defines a coacting contact surface.

8. The assembly as set forth in claim 5 wherein the outward arcuate surface of the bearing pad is asymetric such that the pivot point under normal operating conditions is closer to the trailing edge than the leading edge.

9. A bearing assembly for supporting a shaft for rotational displacement which comprises:
   a plurality of bearing pads spaced about the shaft;
   retainer means positioned to maintain the bearing pads in the desired position;
   said retainer means including lubricant supply means for directing lubricant to the shaft-pad interface;
   at least one of said pads having a first configuration wherein the radially inward bearing pad surface mates with the outer surface of the shaft and a second configuration wherein the radially inward bearing pad surface is partially displaced from the shaft creating a gap for the receipt of lubricant; and wherein the bearing is made from a temperature sensitive material such that at slow speeds and lower operating temperature gradients the bearing pad is in the first configuration and at high speeds with higher operating temperature gradients a portion of the bearing pad is displaced to be in the second configuration.

10. The assembly as set forth in claim 9 wherein the bearing pad defines at least one coolant channel and wherein the liquid supply means directs lubricant to the coolant channel to effectively cool a portion of the bearing pad and to establish an effective temperature gradient.

11. The assembly as set forth in claim 10 wherein when operating in higher temperature conditions the portion of the bearing pad which is cooled retains its original configuration and the portion of the bearing pad not being cooled is displaced to provide a gap between the shaft and pad into which lubricant is supplied to create a lubricant wedge for establishing dynamic lubrication.

12. The assembly as set forth in claim 11 wherein the portion of the bearing pad being cooled is the portion adjacent the trailing edge of the bearing pad.

* * * * *